Nov. 10, 1953  A. H. BAHNSON, JR  2,658,621
APPARATUS FOR CLEANING FILTER SCREENS
Filed June 13, 1950  2 Sheets-Sheet 1
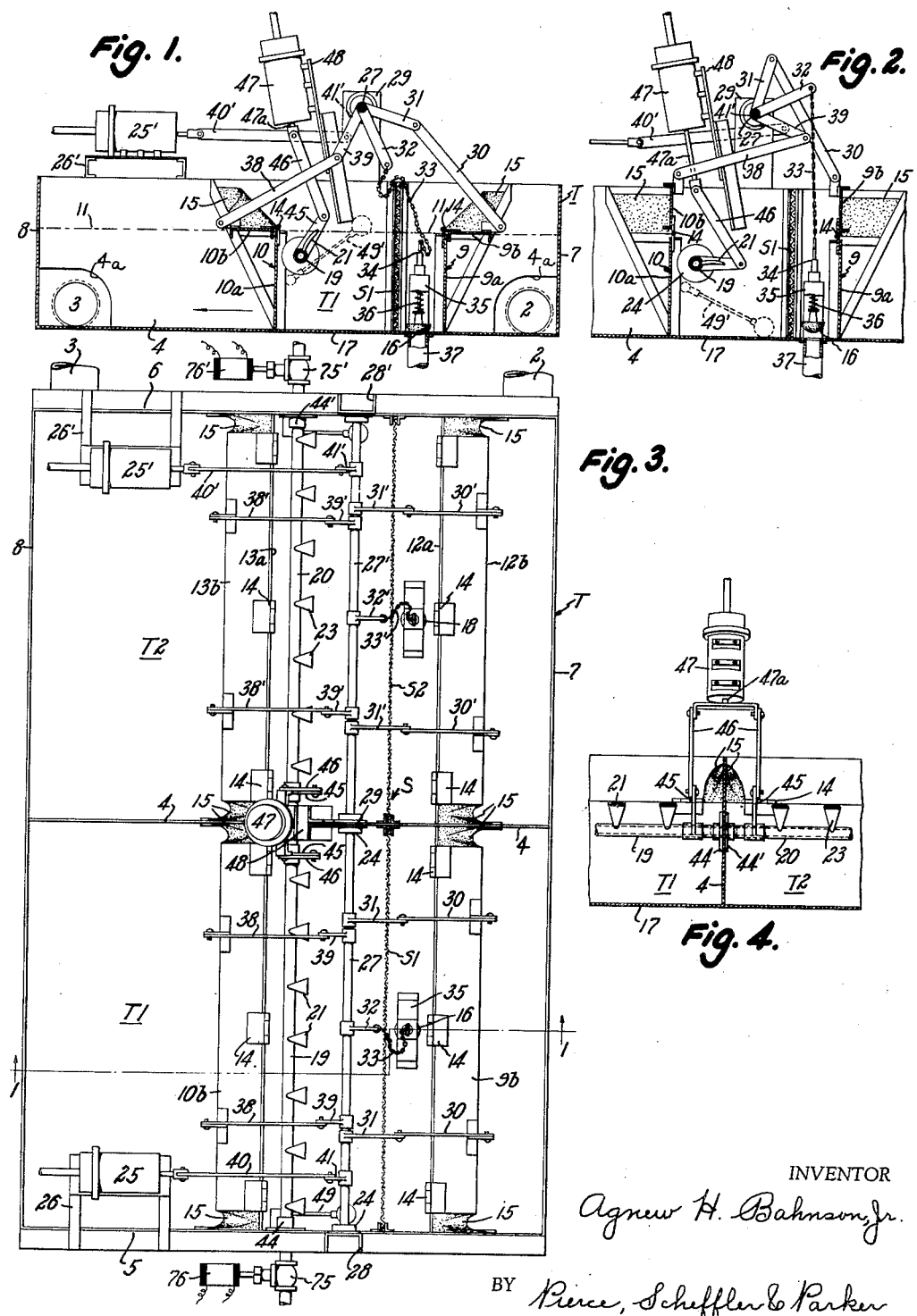
INVENTOR
Agnew H. Bahnson, Jr.
BY Pierce, Scheffler & Parker
ATTORNEYS Patented Nov. 10, 1953

2,658,621

UNITED STATES PATENT OFFICE 2,658,621

APPARATUS FOR CLEANING FILTER SCREENS

Agnew H. Bahnson, Jr., Winston-Salem, N. C.

Application June 13, 1950, Serial No. 167,710

6 Claims. (Cl. 210—152)

This invention relates to apparatus for cleaning filter screens and more particularly the filter screen in the washer tanks of an air washer of the central station type. In the latter, water for washing is fed by a pump to spray nozzles located in the air washing chamber. Any foreign matter present in the air such as dust, dirt, lint, etc. incoming to the washing chamber is washed out by the water issuing from the spray nozzles. The wash water laden with the foreign matter removed from the air is then drained off, filtered through a screen to remove the foreign matter, and then recirculated by the pump to the nozzles.

The foreign matter clings to the filter screen and must be periodically removed to prevent the possibility of clogging the screen which would interfere with free flow of the wash water in the system.

The principal object of this invention is to provide an improved arrangement for cleaning the screen mechanically. Another object is to provide automatic cleaning of the filter screen without interfering with normal operation of the air washer system. Yet another object is to provide an automatic device for cleaning the filter screen cyclically in sections, one section being cleaned while the other is operating and vice versa.

A more specific object is to provide a dam system for isolating a section of the filter tank on opposite sides of the filter screen coupled with means for draining off the isolated section and initiating operation of screen cleaning spray nozzles after the dams have been erected.

The foregoing as well as other objects and advantages inherent in the invention will become more apparent from the following detailed description of a preferred construction of screen cleaner embodying the invention in conjunction with the accompanying drawings in which:

Fig. 1 is a view in longitudinal vertical section of a wash water tank filter screen and cleaning device;

Fig. 2 is a view similar to Fig. 1 but showing the various components in the positions taken during the time a section of the filter screen is being cleaned.

Fig. 3 is a top plan view of the multi-sectional wash water tank and filter screen and cleaning device for each section of the tank and screen;

Fig. 4 is a detail; and

Figure 5:
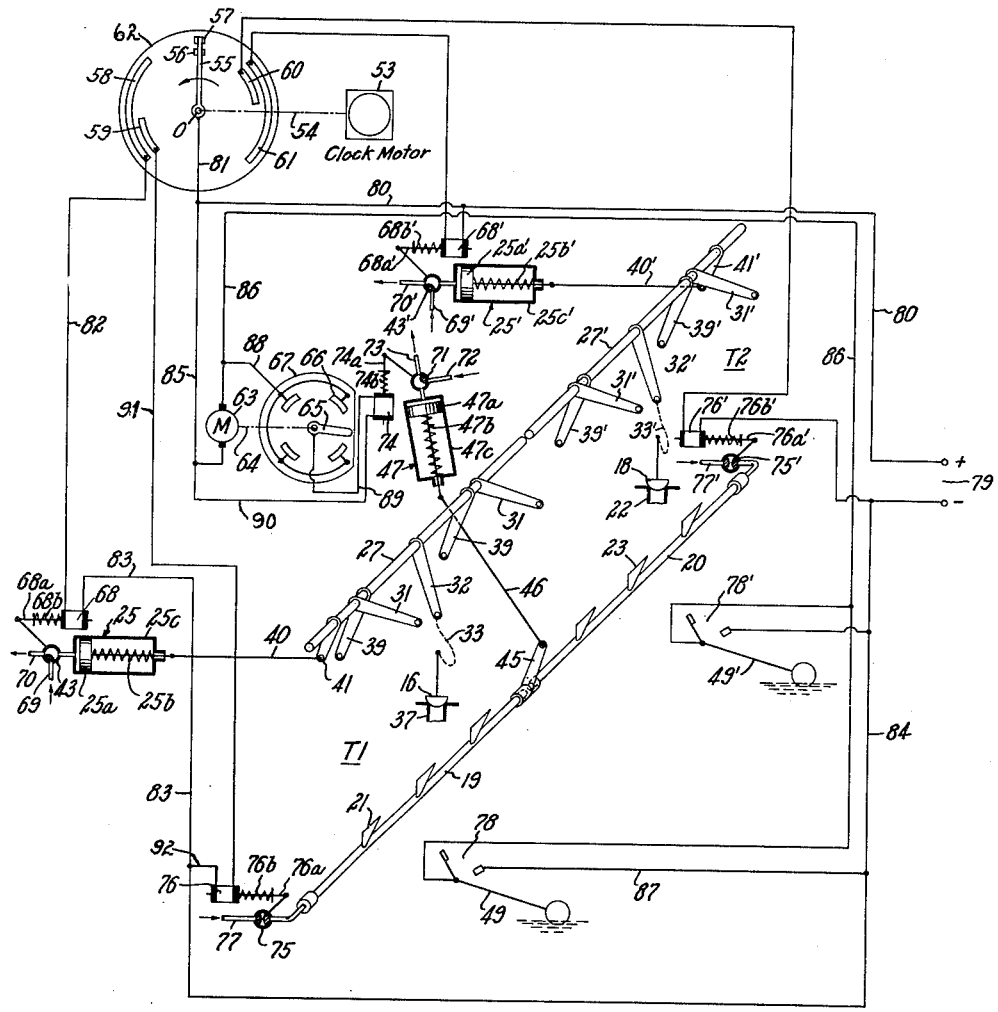
Fig. 5 is a diagrammatic view illustrating the timer system by which each section of the filter screen and tank is cleaned periodically in succession.

Referring now to the drawings, reference character T designates a tank having a dirty water inlet 2, at one end thereof, a clean water outlet 3 at the opposite end and a filter screen S extending transversely between the tank side walls 5, 6, intermediate its end walls 7, 8. A partition 4 extending longitudinally of the tank intermediate the side walls 5, 6 from end wall 7 on the upstream side of filter screen S divides the tank T interior into two sections T1 and T2.

Each section of the tank is provided with erectable dams on opposite sides of the appertaining section of the filter screen to the end that the portion of the tank interior intermediate the dams may be isolated from the remainder. Each dam includes a lower fixed section and an upper hinged section. Thus tank section T1 containing filter screen section S1 is provided with dams 9 and 10, each having a lower fixed wall section 9a, 10a and upper hinged wall section 9b, 10b. The water level in the tank is so controlled that when the hinged sections of the dams occupy horizontal positions as shown in Fig. 1, water will flow freely from the inlet end of the tank to the opposite outlet end, the normal level being generally indicated by water line 11. When the hinged dam sections 9b, 10b are raised to vertical position, as shown in Fig. 2, dam 9 on the upstream side of filter screen S1 will however be effective to prevent further flow of water through tank section T1.

The other tank section T2 containing section S2 of the filter screen is similarly provided with dams 12, 13 each having a lower fixed wall section 12a, 13a and an upper hinged wall section 12b, 13b.

It will be observed from the drawings, particularly Fig. 3, that the lower stationary dam walls 9a, 10a, 12a and 13a extend transversely for the entire width of the tank sections T1, T2. The ends of the upper dam walls, 9b, 10b, 12b and 13b, each pivotally connected to the top edge of the associated lower dam wall by a plurality of spaced hinges 14, terminate short of the side walls of the tank. Flexible flaps 15 fastened at opposite sides thereof to the ends of the movable hinged wall sections 9b, 10b, 12b, 13b of the dams and to the side walls 5, 6 and 4 of tank sections T1, T2 close the gaps between the ends of the movable dam walls and the tank sides when the upper wall sections of the dams are erected.

Tank section T1 includes a drain plug 16 in the bottom wall 17 for the mouth of drain pipe 37 located between the upstream side of filter screen section S1 and dam 9, and tank section T2 includes a similar drain plug 18 for the mouth of drain pipe 22 located between filter screen section S2 and dam 12.

Tank section T1 also includes a horizontally disposed nozzle header pipe 19 situated between the downstream side of the filter screen section S1 and dam 10, and tank section T2 likewise includes a similarly arranged nozzle header pipe 20 between filter section S2 and dam 13. The header pipes 19, 20 are provided with a plurality of spray nozzles 21, 23, respectively which direct sprays of water through the filter screen sections S1, S2 in a direction generally counter to that in which wash water flows through the screens.

According to the invention, I prefer to couple together the various components of the cleaning device for the filter screens in such manner that, as each section S1, S2 of the filter screen is isolated by erection of the dam walls on opposite sides thereof, the drain plug associated therewith will be pulled to drain off the water trapped between the associated upstream and downstream dams, the associated spray header pipe and nozzle will be given an oscillatory motion and the valve controlling flow of water through the header pipe and nozzles turned on, thus directing sprays of water through the filter screen and cleaning off the upstream side of the screen particularly through the "reverse flushing" principle.

In order that the various components of each cleaning unit shall operate in the proper sequence, I employ for each unit a fluid motor, the piston of which operates a rock shaft having a plurality of crank arms that are connected respectively by linkage to the upper hinged wall sections of the upstream and downstream dams and the drain plug. Also used is a float actuated switch controlling operation of the valve supplying water to the flushing nozzles.

The control components associated with section T1 of the tank include a fluid motor 25 carried on a bracket 26 secured to tank wall 5 and a horizontal rock shaft 27 mounted in bearings 24 carried by vertical supports 28, 29 upstanding at the side wall 5 and partition 4. The pivoted upper wall section 9b of dam 9 is connected via spaced links 30 to spaced crank arms 31 on rock shaft 27. Drain plug 16 is connected to another crank arm 32 on shaft 27 via a flexible chain 33 and guide rod 34 operating in a guide sleeve 35. Plug 16 is secured to the lower end of rod 34, cord 33 is secured to the top of the rod, and a helical spring 36 is used to bias the plug 16 to closed position over the entrance to drain pipe 37. Spaced links 38 connect the pivoted dam wall section 10b to other spaced crank arms 39 on rock shaft 27. The piston 25a of motor 25 is connected via a link 40 to crank arm 41 on rock shaft 27. As shown in Fig. 5, motor piston 25a is loaded by spring 25b to the left, i. e. in such direction as will cause clockwise rotation of rock shaft 27, as viewed in the drawings, and movement of the upper dam walls 9b, 10b to horizontal position in tank section T1. Also with the motor piston 25a in the extreme left position as shown in Fig. 1, there will be ample slack in the pull cord 33 to enable lowering of the drain plug 16 to its closed position.

When motive fluid such as air or liquid under pressure is introduced to the cylinder 25c of motor 25 through valve 43, piston 25a is forced to the right thus turning rock shaft 27 to the position shown in Fig. 2, thus erecting the dam walls 9b, 10b, and pulling cord 33 and hence drain plug 16 upwardly off its seat. As previously explained, erection of the dam walls and removal of the plug isolates that portion of tank section T1 between dam walls 9 and 10 and permits the water in the isolated section to drain off through pipe 37.

The horizontally arranged spray header pipe 19 associated with tank section T1 is mounted at its ends in bearings 44 on the tank side walls 5 and 6 for oscillation on its support axis. A crank arm 45 secured to pipe 19 is connected by link 46 to the piston 47a of another fluid motor 47 supported on bracket 48 secured to the partition wall 4. Piston 47a is loaded by spring 47b upwardly towards that end of the cylinder 47c into which the motive fluid is introduced periodically thus effecting periodic reciprocation of piston 47a and like periodic oscillation of header pipe 19.

As will be explained later in further detail, oscillation of header pipe 19 starts automatically as the water trapped between dams 9 and 10 drains off, the desired control being effected electrically by means of a switch controlled by a pivotally mounted float arm 49 located in tank section T1 on the downstream side of filter section S1.

The dams and drain plug associated with tank section T2 are controlled by mechanism identical with that which has been described in detail above for tank section T1, and in the interest of simplifying the description, I have considered it sufficient merely to identify the control components of tank section T2 corresponding to like components of tank section T1 by the same reference numerals but with primes added to the former to distinguish them from the latter. The rock shaft in tank section T2 and its supports have likewise been assigned the same reference numerals that designate corresponding components in the tank section T1, but with primes added thereto.

With reference to Fig. 4 in particular, it will be observed that only one motor 47 is used to oscillate the header pipe 20 in tank section T2 as well as header pipe 19 in tank section T1. A separate motor could of course be used for each header pipe but since water is admitted only to the particular header pipe of the screen section S1 or S2 being cleaned, there is no objection to oscillating both headers together by a common motor.

As explained in the introductory portion of this specification, I prefer to clean first one section of the filter screen S and then the other to the end that the air washing system can continue in operation while the screen is being cleaned. I also prefer to have the cleaning of the screens done automatically in a timed cycle. With these two objectives in mind, reference should now be made to Fig. 5 which illustrates a suitable control system that operates over a cycle that repeats itself indefinitely so long as it remains in operation.

A timer motor 53 which can be of the clockwork type is used to rotate a shaft 54 and an electrically conductive contact arm 55 attached thereto counterclockwise at a uniform angular velocity dependent upon the particular length of cleaning cycle desired. Arm 55 carries two contacts 56, 57 which are so located radially the center O of arm rotation that they will wipe over two corresponding sets of arcuate contact strips 58, 59 and 60, 61 disposed diametrically of each other on a support plate 62 of insulating material. Contact strips 59 and 60 are shorter than strips 58, 61 and so placed that contact 57 engages strips 58 and 61 a considerable time in advance of engagement between contact 56 and its associated contact strips 59, 60. However, contacts 56, 57 break away from the two sets of strips 58, 59 and 60, 61 at the same instant. The reason for this arrangement will be explained hereinafter.

An electric motor 63 which also runs at a uniform speed has mounted upon its shaft 64 an electrically conductive contact arm 65 adapted to wipe over four equally spaced arcuate contact strips 66 mounted on a support plate 67 of insulating material.

The two-way valves 43, 43' associated with fluid motors 25, 25' are controlled by solenoids 68, 68' whose armatures 68a, 68a' are loaded by springs 68b, 68b' in such direction as to cut off the supply of compressed air entering at pipes 69, 69' from the motor cylinders 25c, 25c' and place the latter in communication with pipes 70, 70' leading to atmosphere when the solenoids are in a deenergized condition. The solenoids are shown in this position in Fig. 5.

Motor 47 which oscillates the spray header pipes 19, 20 is also controlled by a similarly constructed two-way valve 71 having a compressed air inlet pipe 72, and a pipe 73 for placing the motor cylinder 47c in communication with the atmosphere. Valve 71 is actuated by a solenoid 74 whose armature 74a is loaded by spring 74b in such direction as to cut off the air supply pipe 72 and place the motor cylinder in communication with the atmosphere when solenoid 74 is in a deenergized state.

Water under pressure is supplied to the outer end of spray header pipe 19 through valve 75 controlled by solenoid 76 whose armature 76a is loaded by spring 76b in such direction as to cut off the supply of water from inlet pipe 77 to header pipe 19 when the solenoid is in a deenergized state. Water is supplied to the outer end of spray header pipe 20 by similarly arranged components which for sake of simplification have been assigned corresponding reference numerals but with primes added thereto.

The remaining components of the automatic control consist of a switch 78 the contacts of which close as the float 49 lowers and open when it rises, and a similar switch 78' associated with float 49'.

The control operates in the following manner:

Assuming contact arm 55 to be in the position shown but rotating slowly in the direction indicated by the arrow, all components will occupy the positions shown in Fig. 5. As contact 57 reaches the upper end of contact strip 58, a circuit for energizing solenoid 68 from a source of power supply 79 will be completed via conductors 80, 81, arm 55, engaged contacts 57, 58, conductor 82, the winding of solenoid 68, and conductors 83, 84. Energization of solenoid 68 actuates valve 43 from the position shown to its other position placing compressed air inlet pipe 69 in communication with motor cylinder 25c and causing piston 25a to move to the right and rock shaft 27 from the position shown in Fig. 1 to the position shown in Fig. 2. Such movement of shaft 27 erects the movable dam walls 9b, 10b, in section T1 of the tank, and pulls out drain plug 16. Erection of dam walls 9b, 10b stops the flow of wash water through tank section T1, and the water trapped between the dams 9, 10 flows out the drain pipe 37.

Float 49 follows the level of the water being drained through pipe 37 and ultimately drops far enough to close switch contacts 78 which completes a circuit for energizing and starting motor 63 from the power source 79. This circuit may be traced from one side of source 79 through conductors 80, 85, motor 63, conductor 86, switch contacts 78 and conductors 87, 84 to the other side of power source 79.

All four of the contact strips 66 are connected together and via conductors 88, 86, switch contacts 78 and conductors 87, 84 to one side of power source 79. Contact arm 65 is connected via conductor 89 to one side of the winding of solenoid 74, and the other side of the winding of solenoid 74 is returned to the other side of power source 79 through conductors 90, 85 and 80. Thus each time arm 65 engages one of the contact strips 66, solenoid 74 will become energized thus opening valve 71 to admit compressed air to motor cylinder 47c and driving the piston 47a downward to rock the spray headers 19, 20. When contact arm 65 is between adjacent contact strips 66, the energizing circuit of solenoid 74 is open. Thus as contact arm 65 breaks contact with each strip 66, solenoid 74 deenergizes thus moving valve 71 to its other position where motor cylinder 47c is placed in communication with the atmosphere. This allows loading spray 47b to return piston 47a to its starting position and rock the spring header shafts in the opposite direction. Motion of the motor piston 47 is thus periodic thus imparting an oscillatory motion to the spray header pipes 19, 20.

By the time that contact arm 55 has rotated far enough to engage the other and shorter contact strip 59, the water trapped between dams 9 and 10 will have had an opportunity to drain out. Engagement between contact 56 and contact strip 59 completes a circuit for energizing solenoid 76, the circuit being traced from one side of power source 79 through conductors 80, 81, arm 55, engaged contacts 56, 59, conductor 91, the winding of solenoid 76, and conductors 92, 84 to the other side of source 79. Energization of solenoid 76 actuates valve 75 to open position, and water for reverse flushing of the filter screen section S1 to clear away the dirt lodged in the filter screen and particularly against the surface of the screen on the upstream side is then admitted to spray header 19, discharging through spray nozzles 21.

The amplitude of oscillation of the spray nozzles 21 is sufficiently great to enable the sprays discharged from the nozzle to sweep the filter screen section S1 from top to bottom, and the nozzles 21 are spaced sufficiently close together along the entire length of the spray header pipe 19 as to assure complete cleaning of the screen section S1 throughout its entire width. This arrangement provides clearing of the entire area of the filter screen, and the dirt, lint, etc. removed from the screen is washed down the drain pipe 37.

Reverse flushing of the filter screen section S1 continues until contacts 56, 57 break simultaneously with their associated contact strips 58, 59. When this occurs, solenoid 76 becomes deenergized thus closing valve 75 and shutting off flow of water to spray header pipe 19. Simultaneously, solenoid 68 becomes deenergized, moving valve 43 to its other position allowing piston 25a to move back to its starting position under the restoring force of spring 25b, and rocking shaft 27 to the position shown in Fig. 1 thus lowering dam walls 9b, 10b and dropping drain plug 16 into closed position over the entrance to drain pipe 37.

The tank section T1 thus again fills with washing water, and the circulating pump (not shown) will draw water through the outlet 3 from both sections T1, T2 of the tank. When the tank section between dams 9 and 10 refills, float 49 will rise to open the contacts of switch 78 thus deenergizing and stopping motor 63 which in turn stops oscillation of motor piston 47a and hence spray header pipe 19, and also deenergizing solenoid 74 since the circuit to the latter from the power source also extends through the float switch contacts 78.

When contact arm 55 has rotated to the position where contact 57 engages contact strip 61, relay 68' becomes energized to actuate valve 43' effecting displacement of motor piston 25a' and rocking shaft 27' to the position where dam walls 12b, 13b in tank section T2 will be erected and the drain plug 18 pulled upward. Water trapped between dams 12 and 13 will then drain out causing closure of float switch contacts 78' which is effective to start contact motor 63 again and set spray header pipes 19, 20 into oscillation. When contact 56 on arm 55 reaches contact strip 66, solenoid 76' becomes energized to open valve 75' and admit water under pressure to spray header pipe 20 for reverse flushing and cleaning of filter section S2.

Reverse flushing of filter section S2 continues until contacts 56, 57 leave contact strips 60, 61 simultaneously, at which instant valve 75' is cut off to stop flow of water through nozzles 23, and shaft 27' rocked back to its other position folding down dam walls 12b, 13b, and reinserting drain plug 18 in the mouth of drain pipe 22. Tank section T2 will then refill opening switch contacts 78' to stop motors 63 and 47 and washing water for the air will again be passed through filter section S2 to the tank outlet 3. This completes a complete cleaning cycle.

Both sections S1, S2 of the filter will then remain in operation until contact 57 on contact arm 55 again reaches contact strip 58 thereby to begin the cleaning cycle anew.

As shown in Fig. 1, the central partition 4 has a portion 4a cut away at the end wall 8 of the tank and a similar cut-away portion at the end wall 7. The purpose of these is to allow free flow of water into both sections T1, T2 of the tank from the single inlet pipe 2 which enters section T2 through wall 6, and free outflow from both tank sections into the single outlet pipe 3 which also enters section T2 through wall 6. Thus while section S1 of the filter screen is being cleaned, dirty wash water from the air washing chamber is still free to pass from inlet 2 through tank section T2 and filter screen S2 and thence out through pipe 3 into a pump for recirculation in the air washing chamber. Likewise, when section S2 of the filter screen is being cleaned, tank section T1 remains in operation filtering the dirty wash water through filter screen S1. In this manner, the system never has to be shut down for cleaning of the filters thus permitting continuous operation of the air washer.

In conclusion, I wish it to be expressly understood that while the foregoing illustrated embodiment of my improved filter screen cleaning apparatus is preferred, various detail changes in the construction and arrangement of the component parts may be made without however departing from the spirit and scope of my invention as defined in the appended claims.

I claim:

1. Filter apparatus comprising a tank having a partition member extending longitudinally thereof intermediate the tank side walls and dividing the interior of the tank into a pair of tank sections through which liquid is adapted to flow; a filter placed crosswise of the direction of liquid flow in each tank section; a liquid inlet to both sections on the upstream side of the filters; a liquid outlet from both sections on the downstream side of said filters; each said tank section including a pair of dams erectable respectively on the upstream and downstream sides of said filter to isolate that portion of the tank interior between the said two dams from the remainder of the tank interior, a normally closed drain disposed between said filter and the dam upstream therefrom, a valve controlled flushing device disposed between said filter and the dam located downstream therefrom for directing a flushing fluid through the filter in a generally upstream direction, means for erecting said dams and opening said drain and for lowering said dams and re-closing said drain, and means opening the valve on said flushing device when said dams are erected; and control means operating the dams of each tank section in sequence such that the dams of only one section are erected at any one time thereby cleaning the filter of one tank section while the other remains in operation.

2. Filter apparatus comprising a tank; a partition dividing the interior of said tank into a pair of tank sections through each of which a stream of liquid to be filtered is adapted to flow; each said tank section including a filter placed crosswise of the direction of liquid flow through the section, a pair of dams placed crosswise of the section located respectively upstream and downstream from the filter, each said dam including a lower vertical stationary portion and an upper portion hinged to said lower portion for movement about a transverse axis into a position substantially coplanar with said lower portion, thereby to block off further flow of liquid through the section, a drain from the tank interior disposed between said filter and the dam upstream therefrom, a closure member for the mouth of said drain, a plurality of spray nozzles carried by a header pipe oscillatory about its axis and disposed between said filter and the dam downstream therefrom adapted to direct flushing fluid through the filter in a generally upstream direction, a rock shaft extending crosswise of the tank section, linkage means connecting the movable portions of both dams with crank arms on said rock shaft, means connecting the closure member for said drain with another crank arm on said rock shaft, the crank arms on said rock shaft being arranged so that said closure member is lifted from the mouth of said drain when the upper portions of said dams are moved to their positions blocking off liquid flow through the section, and a motor controlling rotation of said rock shaft; a second motor for setting the spray header pipes of both tank sections into oscillation; and a timer device for actuating the motors controlling the dams of the two tank sections in sequence such that the filter of one tank section is cleaned while the other tank section continues in operation, said timer also including means setting said second motor into operation for a predetermined period during the filter cleaning phase of each section and means controlling the flow of flushing fluid through the spray header pipes of both sections.

3. A filter tank for liquids having an inlet at one end, an outlet at the other end, a channel for liquid flow therethrough between said inlet and outlet, a filter placed crosswise of said channel for filtering the liquid flowing therethrough, a pair of damming devices located respectively upstream and downstream from said filter, an outlet drain from said channel disposed between said filter and the damming device located upstream therefrom, means for opening said drain and actuating said damming devices from a non-damming position to a damming position transversely of said channel wherein the channel portion therebetween is isolated from the remainder of the liquid in said tank and for re-closing said drain and re-actuating said damming devices to their non-damming position, a valve-controlled flushing device for said filter disposed between said filter and the damming device located downstream therefrom for effecting reverse flushing of said filter, and means for automatically opening said valve on said flushing device when said damming devices are disposed in their damming position and for closing said valve when said damming devices are disposed in their non-damming position.

4. A filter tank as defined in claim 3 wherein each said damming device comprises a lower stationary wall section disposed transversely of said channel and an upper wall section hinged to said lower section for swinging movement into a substantially vertical position and which is connected to the said actuating means for said damming devices.

5. A filter tank as defined in claim 4 wherein the upper hinged wall section of said damming device is spaced from the tank walls forming the sides of said channel, the gap between the ends of said hinged section and tank walls being bridged by a flexible flap.

6. A filter tank as defined in claim 3 wherein said device for reverse flushing of the filter comprises a header pipe having a plurality of nozzles, said header pipe being placed transversely of the channel, and means imparting an oscillatory motion to said header pipe about it longitudinal axis.

AGNEW H. BAHNSON, Jr.

References Cited in the file of this patent

UNITED STATES PATENTS

| Number | Name | Date |
|---|---|---|
| 1,253,674 | Dunbar | Jan. 15, 1918 |
| 2,217,751 | Hughes | Oct. 15, 1940 |